(12) United States Patent
Holmes (10) Patent No.: US 9,745,750 B2
(45) Date of Patent: Aug. 29, 2017

(54) MODULAR COMPOSITE POLE

(71) Applicant: Highland Industries, Inc., Kernersville, NC (US)

(72) Inventor: Scott T. Holmes, Oxford, PA (US)

(73) Assignee: Highland Industries, Inc., Kernersville, NC (US)

( * ) Notice: Subject to any disclaimer, the term of this patent is extended or adjusted under 35 U.S.C. 154(b) by 4 days.

(21) Appl. No.: 14/718,734

(22) Filed: May 21, 2015

(65) Prior Publication Data

US 2015/0252565 A1 Sep. 10, 2015

Related U.S. Application Data

(63) Continuation of application No. 14/160,713, filed on Jan. 22, 2014, now Pat. No. 9,091,097, which is a
(Continued)

(51) Int. Cl.
*E04C 3/30* (2006.01)
*E04C 3/36* (2006.01)
(Continued)

(52) U.S. Cl.
CPC .................. *E04C 3/30* (2013.01); *E04C 3/36* (2013.01); *E04H 12/02* (2013.01); *E04H 12/342* (2013.01);
(Continued)

(58) Field of Classification Search
CPC ......... E04H 12/02; E04H 12/34; E04H 12/24; E04H 12/085; E04H 12/182;
(Continued)

(56) References Cited

U.S. PATENT DOCUMENTS

| 122,656 A | 1/1872 | Rogers |
| 1,743,439 A | 1/1930 | De Witt |

(Continued)

FOREIGN PATENT DOCUMENTS

| CA | 2310166 A1 | 11/2001 |
| CA | 2428549 A1 | 11/2004 |

(Continued)

OTHER PUBLICATIONS

International Search Report and Written Opinion mailed Sep. 20, 2010 corresponding to International Patent Application No. PCT/US10/02127.

*Primary Examiner* — Joshua J Michener
*Assistant Examiner* — Matthew Gitlin
(74) *Attorney, Agent, or Firm* — Tuggle Duggins P.A.; Blake Hurt (57) ABSTRACT

A modular composite utility pole has a plurality of sections, each with a tapered hollow tube having a plurality of plies, wherein a first end has a larger diameter than a second end, wherein each section is adapted to join at least one adjoining section at a joint wherein the first end of an upper section overlaps the second end of a lower section, the lower section having a ledge proximate to the second end of the lower section, with a fastener passing through the joint via apertures in the sections, and wherein, when the modular composite utility pole is erected, the joint is self-located by the joint features, and wherein substantially all vertical load is transferred between sections via the a surface of the second end of the upper section resting upon the ledge of the lower section. Also disclosed are individual sections and methods of making them.

21 Claims, 7 Drawing Sheets

Related U.S. Application Data continuation of application No. 12/846,135, filed on Jul. 29, 2010, now abandoned.

(60) Provisional application No. 61/236,474, filed on Aug. 24, 2009.

(51) Int. Cl.

| | | |
|---|---|---|
| *E04H 12/02* | (2006.01) | |
| *E04H 12/34* | (2006.01) | |
| *E04H 12/08* | (2006.01) | |
| *B29L 31/00* | (2006.01) | |
| *F03D 13/20* | (2016.01) | |

(52) U.S. Cl.
CPC ....... *B29L 2031/766* (2013.01); *E04H 12/085* (2013.01); *F03D 13/20* (2016.05); *Y10T 428/131* (2015.01)

(58) Field of Classification Search
CPC ..... E04H 12/2269; E04H 12/08; E04H 12/16; E04H 12/2292; E04H 12/342; E04H 12/344; B29L 2031/799; B29L 2022/00; F03D 11/04; F03D 1/065; E04C 3/36; E04C 3/30
USPC .............. 52/834, 835, 848; 29/897.3, 897.33, 29/419.1, 527.1, 527.2; 156/166, 169, 156/173, 175, 180
See application file for complete search history.

(56) References Cited

U.S. PATENT DOCUMENTS

| | | |
|---|---|---|
| 1,870,770 A | 8/1932 | De Witt |
| 2,090,972 A | 8/1937 | Allen |
| 3,031,041 A | 4/1962 | Pfaff, Jr. |
| 3,034,209 A | 5/1962 | Bianca et al. |
| 3,270,480 A | 9/1966 | Beecker |
| 3,325,950 A | 6/1967 | Pfaff, Jr. |
| 3,429,758 A | 2/1969 | Young |
| 3,544,110 A | 12/1970 | Dickinson |
| 3,554,110 A | 1/1971 | Goetz |
| 3,564,804 A | 2/1971 | Archer et al. |
| 3,678,265 A | 7/1972 | Porter et al. |
| 3,886,029 A | 5/1975 | Poulsen |
| 4,246,732 A | 1/1981 | Frehner |
| 4,381,960 A | 5/1983 | Pinter et al. |
| 4,878,984 A | 11/1989 | Bourrieres |
| 4,934,861 A | 6/1990 | Weeks et al. |
| 5,060,437 A | 10/1991 | Parsons et al. |
| 5,090,837 A | 2/1992 | Mower |
| 5,213,379 A | 5/1993 | Taniguchi et al. |
| RE35,081 E | 11/1995 | Quigley |
| 5,492,579 A | 2/1996 | Hosford et al. |
| 5,513,477 A | 5/1996 | Farber |
| 5,661,946 A | 9/1997 | Davis |
| 5,704,187 A | 1/1998 | Hosford et al. |
| 5,826,847 A | 10/1998 | Warner et al. |
| 6,167,673 B1 | 1/2001 | Fournier |
| 6,191,355 B1 | 2/2001 | Edelstein |
| 6,367,225 B1 | 4/2002 | Ashton |
| 6,955,024 B2 | 10/2005 | Ashton |
| 7,268,691 B2 | 9/2007 | Koors et al. |
| 7,274,305 B1 | 9/2007 | Luttrell |
| 7,284,356 B2 | 10/2007 | Copeland |
| 7,363,751 B2 | 4/2008 | Copeland |
| 7,866,121 B2 | 1/2011 | Polyzois et al. |
| 8,082,719 B2 | 12/2011 | Bagepalli |
| 8,302,368 B1 | 11/2012 | Keel |
| 2004/0118077 A1 | 6/2004 | Chin et al. |
| 2008/0042492 A1 | 2/2008 | Gleason et al. |
| 2008/0250752 A1 | 10/2008 | Bowman et al. |
| 2008/0283176 A1 | 11/2008 | Bottacin |
| 2009/0019816 A1 | 1/2009 | Lockwood et al. |
| 2009/0071593 A1 | 3/2009 | Slaback et al. |
| 2009/0169393 A1 | 7/2009 | Bagepalli et al. |

FOREIGN PATENT DOCUMENTS

| | | |
|---|---|---|
| CA | 2444324 A1 | 4/2005 |
| CA | 2495596 A1 | 8/2006 |
| CA | 2529523 A1 | 6/2007 |
| CA | 2540747 A1 | 9/2007 |
| WO | 2006/081679 A1 | 8/2006 |
| WO | 2006/081685 A1 | 8/2006 |
| WO | 2007/090259 A1 | 8/2007 |

MODULAR COMPOSITE POLE

CROSS REFERENCE TO RELATED APPLICATIONS

This application is a continuation of U.S. patent application Ser. No. 14/160,713, filed Jan. 22, 2014, now issued as U.S. Pat. No. 9,091,097 on Jul. 28, 2015, which is a Continuation of U.S. patent application Ser. No. 12/846,135, filed Jul. 29, 2010, which claims priority under 35 U.S.C. §119(e) to U.S. provisional application Ser. No. 61/236,474, filed on Aug. 24, 2009, the entire contents of which are incorporated herein by reference.

FIELD

The present invention is in the technical field of utility poles, such as for power distribution and communications. The present invention is also in the technical field of composites.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Wood is the predominant material used for utility poles sized for distribution ("distribution poles"). The wood is harvested from forests and prepared and treated with chemicals to help prolong its useful life. Nonetheless, wood may be subject to infestation, rot, and/or decay due to environmental conditions. Thus, wood requires maintenance, creating an operational burden. Wood poles are also heavy, making handling, installation, and replacement difficult.

Furthermore, wood poles are solid and do not yield on impact, thus creating a hazard to motor vehicles and their occupants. This problem is exacerbated by the fact that distribution poles tend to be located along roadways.

A need exists for utility poles exhibiting long service life as well as the ability to be easily installed and/or repaired in the field.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

SUMMARY

The present invention may address one or more of the problems and deficiencies of the prior art discussed above. However, it is contemplated that the invention may prove useful in addressing other problems and deficiencies, or provide benefits and advantages, in a number of technical areas. Therefore the claimed invention should not necessarily be construed as limited to addressing any of the particular problems or deficiencies discussed herein.

According to certain aspects, the present invention can provide a modular composite utility pole, sections thereof, and methods of making such sections and poles.

According to further optional aspects, the invention can be utilized in a number of potential applications, including but not limited to support of power distribution cables and communications lines.

It can be desirable for utility poles to exhibit long life by virtue of being weather resistant. It may also be desirable for such poles to provide for convenient repair in the field in the event of damage, for example damage caused by impact with a motor vehicle.

According to one aspect of the present invention there is provided a section of a modular composite utility pole comprising a tapered hollow tube comprising a plurality of plies, a first end, and a second end, wherein the first end has a larger diameter than the second end; at least one aperture proximate to an end and adapted to receive a fastener; and a built-up ledge around the periphery of the tapered hollow tube and proximate to the second end thereof, the ledge comprising a plurality of plies having one or more filaments wound at an angle relative to a longitudinal axis of the tapered hollow tube.

According to a further aspect, the present invention provides a modular composite utility pole comprising a plurality of sections, each comprising a tapered hollow tube comprising a plurality of plies, a first end, and a second end, wherein the first end has a larger diameter than the second end, wherein each section is adapted to join at least one adjoining section at a joint wherein the first end of an upper section overlaps the second end of a lower section, the lower section further comprising a ledge proximate to the second end of the lower section, the ledge comprising a plurality of plies having one or more filaments wound at an angle relative to a longitudinal axis of the tapered hollow tube, wherein each section includes at least one aperture proximate to an end, the aperture being adapted to align with a corresponding aperture in the at least one adjoining section and to receive a fastener passing through the joint, and wherein, when the modular composite utility pole is erected, substantially all vertical load is transferred between sections via the a surface of the second end of the upper section resting upon the ledge of the lower section.

According to another aspect, there is provided a method of making a section of a composite utility pole, the method comprising: (a) wetting a filament in resin; (b) winding the wetted filament on a tapered mandrel; (c) curing the wetted filament to create a tapered hollow tube comprising a plurality of plies, a first end, and a second end, wherein the first end has a larger diameter than the second end; (d) machining an end of the tapered hollow tube at a predetermined position along the length of the tapered hollow tube; and (e) creating an aperture through the tapered hollow tube at a predetermined distance from the machined end.

DEFINITIONS

Unless otherwise defined herein or below in the remainder of the specification, all technical and scientific terms used herein have meanings commonly understood by those of ordinary skill in the art to which the present invention belongs.

Before describing the present invention in detail, it is to be understood that the terminology used in the specification is for the purpose of describing particular embodiments, and is not necessarily intended to be limiting. As used in this specification and the appended claims, the singular forms "a", "an" and "the" do not preclude plural referents, unless the content clearly dictates otherwise.

Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

DETAILED DESCRIPTION

According to certain aspects of the present invention, a modular composite utility pole provides for an interlocking joint between sections. The sections can fit together precisely and can be assembled without field drilling and without requiring special tools on site. In contrast, existing systems must be field-drilled and require special methods and tools to be assembled in the field.

The modular composite utility pole may have sections that are predrilled to ensure accurate end location, so that the sections are easily interchangeable with a minimum of work on-site. For example, in the event of a collision, the pole can be disassembled in the field and only the damaged section replaced.

In an embodiment, the sections can be nested together prior to assembly in order to be stored in a smaller space, thereby reducing the logistical burden and transportation costs.

In one embodiment, one section, for example the top section, is specially adapted for the attachment of heavy equipment or objects. In another embodiment, a section includes a sensor bay. Optionally, the section includes both of these features. Further details regarding these features are found below.

Figure 1:
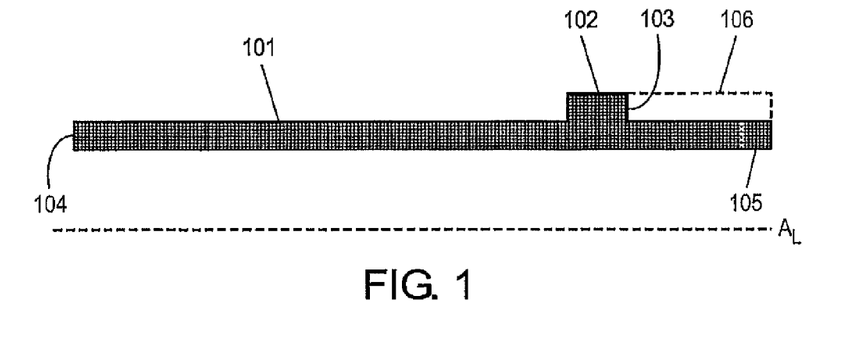
FIG. 1 is a schematic illustration of an exemplary cross-section of a wall of a section of a modular utility pole of the present invention.

Features of an exemplary section of a modular utility pole are illustrated in FIG. 1. FIG. 1 is a schematic of an exemplary cross-section through one wall of a tapered hollow tube of the section of the pole. The longitudinal axis is represented by line AL. The section 101 includes a ledge 102 (a feature which can be absent from a top section of the pole). In one embodiment, the ledge has a surface 103 to enable precise fitting of the section with an adjoining section. In the event that the section is not the bottom section of the pole, it is preferred that a surface 104 of the section is also adapted to precisely locate the section against a lower section. In making the section, an area including that denoted by dashed line 106 may be built up, then machined away to make surface 103. Optionally, or in addition, the ledge 102 may be supported with forming material during curing. The section further includes an aperture 105 passing through the wall and adapted to receive a fastener.

In an embodiment, the ledge 102 extends about two inches laterally from the wall of the section 101. Preferably, the ledge includes plies wound at about 80 to about 90 degrees relative to the longitudinal axis. Although the ledge is illustrated as having a rectangular cross-section, it may take other many forms, for example with a tapered side opposite the machined surface 103.

A section may generally take the form of a tapered hollow tube optionally with fibrous plies wound at angle A, about 80 to about 90 degrees or about 85 to about 90 degrees, plies wound at about 40 to about 65 degrees, and/or plies wound at about 5 to about 25 degrees, wherein the degrees are measured relative to a longitudinal axis AL. (See, e.g., FIG. 8). Moreover, the winding angle of the fibrous pieces may vary along the longitudinal length of the pole or pole section. For example, the plies may be wound at angle A, of about 85 degrees to about 90 degrees in the region corresponding to the area of the joint between pole sections, the decrease in any, suitable manner, such as gradually abruptly, constantly, or decreasing on a gradient, such that the winding angle A, decreases along the longitudinal direction away from the joint area. According to one embodiment, the winding angle A, is about 90 degrees proximate the end of the pole section in the joint area of the pole, then gradually decreases along the longitudinal direction away from the joint area along a transition zone approximately 24 inches from the end of the pole, the winding angle Aw being about 65 degrees to about 40 degrees on this zone T. Further, along the longitudinal direction of the pole, moving away from the transition zone T, the winding angle A, varies from about 40 degrees to about 25 degrees or about 40 degrees to about 5 degrees until reaching the opposite end of the pole or pole section.

The wall of the tapered hollow tube optionally has a thickness of about 0.2 to about 0.8 inches. The tapered hollow tube may have any suitable length, for example about 72 to about 224 inches. It also has any suitable amount of taper, such as tapering at an angle of about 0.2 to about 0.8 degrees per side, thus forming a relatively larger diameter and a relatively smaller diameter end. In an exemplary embodiment, each section has a length of about 12 feet and 4 inches. The top section optionally has holes for the attachment of a crossbar and/or a neutral line.

Figure 2:
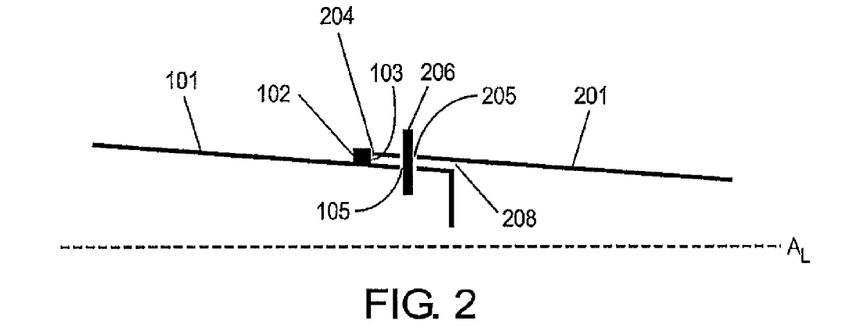
FIG. 2 is a schematic illustration of an exemplary joint between two sections of a modular utility pole of the present invention.

FIG. 2 is a schematic illustration of an exemplary cross-section of a joint between two sections of a modular utility pole. Line AL illustrates the longitudinal axis through the sections. The pole is adapted so that aperture 105 in the lower section aligns with aperture 205 in the upper section in order to permit the joint to be secured by fastener 206. An exemplary fastener 206 is a ⅝" grade 5 double arming bolt. Optionally, the fastener may comprise a pin or any other suitable fastener. A surface 205 of the larger end of the upper section 201 rests on the machined surface 103 of the ledge 102 of the lower section 101.

The joint may be formed so that it does not rely on friction, but instead substantially all vertical load is transferred between sections 101 and 201 via the surface 205 of the second end of the upper section 201 resting upon the surface 103 of ledge 102 of the lower section 101. In an embodiment, a nominal gap 208 exists in the joint between inner and outer peripheral wall surfaces of said adjoining sections. For example, the gap 208 may span 0.020 to 0.060 inches. The fastener can bear primarily only bending and torsion loads, and optionally does not carry a significant amount of the weight of the upper section(s).

Figure 3A:
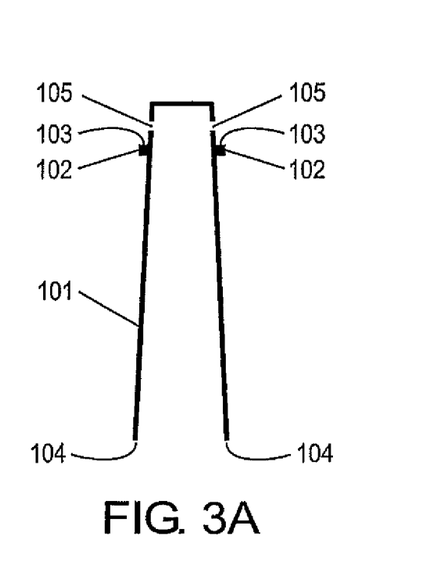
FIG. 3A is a schematic illustration of an exemplary section of a section of a modular utility pole.
Figure 3B:
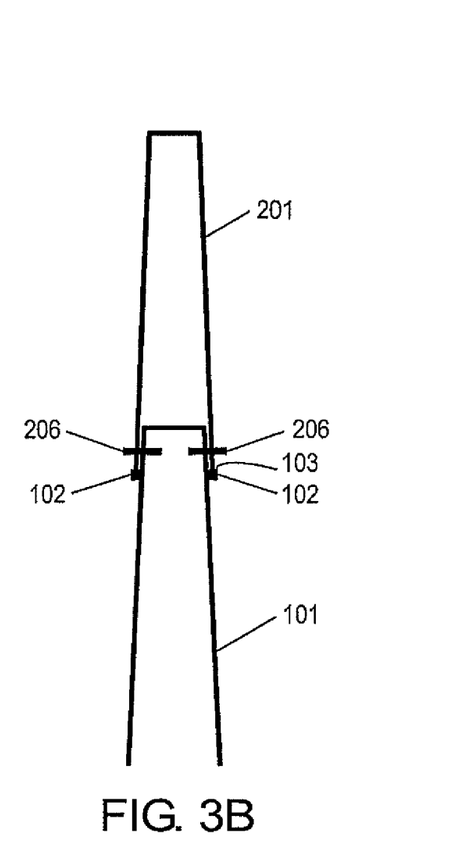
FIG. 3B is a schematic illustration of two such sections joined together according to certain aspects of the present invention.

FIG. 3A is another schematic illustration of an exemplary section of a modular utility pole. The surface 103 of the ledge 102 is precisely located with respect to the end with surface 104 of the section, in order to facilitate interchangeability of the sections. In addition to the illustrated aperture 105, other openings may exist, for example near the opposite end of the section. FIG. 3B is a schematic illustration of two such sections 101 and 201 joined together. Optionally, instead of the joint having two fasteners 206 as illustrated, a single fastener passes entirely through the joint through both pairs of apertures.

Figure 4:
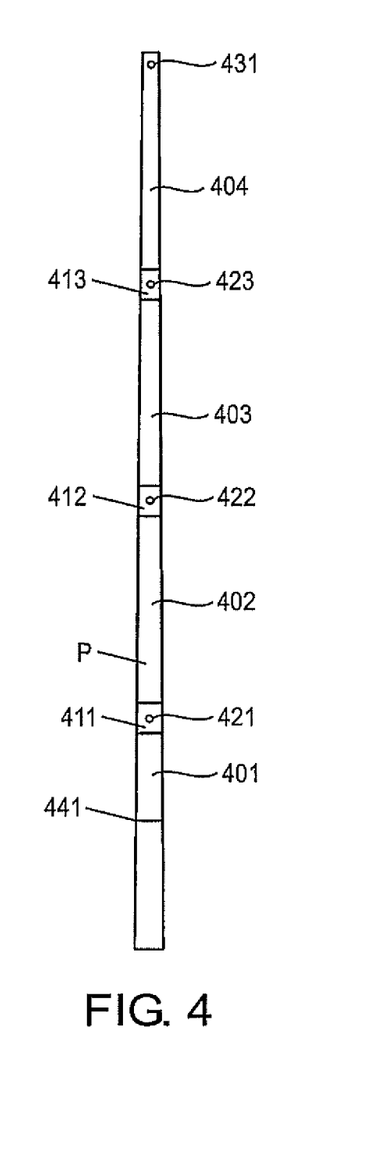
FIG. 4 is a schematic illustration of an embodiment of a four-section modular composite utility pole of the present invention.

FIG. 4 is a schematic illustration of an embodiment of a four-section modular composite utility pole. The pole 400 is assembled from sections 401, 402, 403, and 404. The sections overlap each other at joints 411, 412, and 413. The apertures of the sections are aligned in each joint at 421, 422, and 423. An optional additional opening exists in the top section at 431, for example for the mounting of a crossbar or other object.

The bottom section may be buried in the ground to a certain depth, depending on the height of the pole 400 and other factors. The ground line of such a pole is indicated at 441. According to one optional embodiment, the length of the sections 401 and 402 and location of the first joint 411 therebetween is such that joint 411 of pole 400 is positioned below a typical impact point P on the pole 400 (for example, a typical impact point from a motor vehicle). Thus, if the modular pole 400 is damaged at impact point P, the damaged section 402 can be removed at joints 411 and 421 for replacement and/or repair, without resorting to removing the entire pole 400 and while leaving section 401 in the ground. Thus, the modular utility pole 400 of the present invention can be much more easily and economically repaired and maintained than other utility poles.

Figure 5:
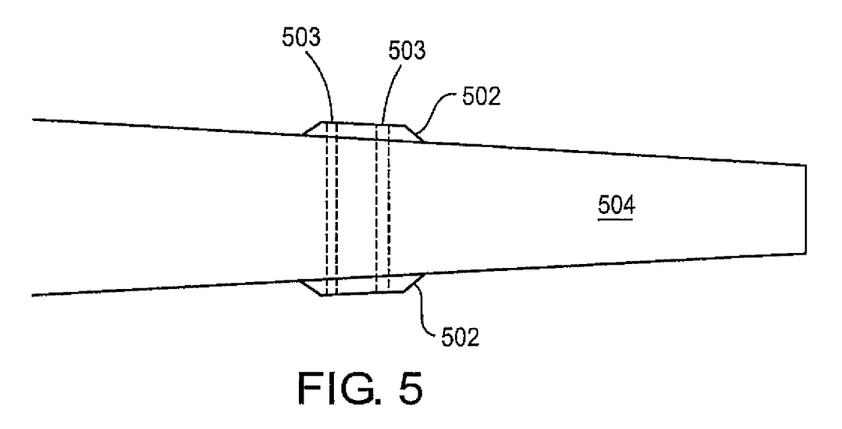
FIG. 5 is schematic illustration of an embodiment of an exemplary section with a built-up area adapted for the attachment of heavy equipment, formed according to the present invention.

FIG. 5 is schematic illustration of an embodiment of a section with a built-up area adapted for the attachment of heavy equipment. In this embodiment, the section 504 has a built-up area 502 of greater wall thickness on the tapered hollow tube adapted for the attachment of heavy equipment. For example, the built-up area 502 may include apertures 503 to enable attachment of heavy equipment. Preferably, this section 504 is adapted to a standard of a utility company so that hardware, special transformers, and other equipment can be attached. This feature can reduce or eliminate the need to drill holes in the pole in the field, thereby avoiding the costs and delays associated with such.

The built-up area 502 can include plies adapted to increase torsional stiffness and wound at winding angles A, of about 40 degrees to about 65 degrees and plies adapted to increase bending stiffness and wound at about 5 degrees to about 25 degrees, wherein the degrees are measured relative to said longitudinal axis. The built-up area preferably increases the ability of the pole to handle loads without adding significant weight, which provides particular advantage near the top of the pole. By allowing the pole to carry additional loads, for example two inch diameter cabling for telephony in addition to electrical power carried by conventional poles, the pole of the present invention can provide the opportunity to generate additional revenue.

Figure 6A:
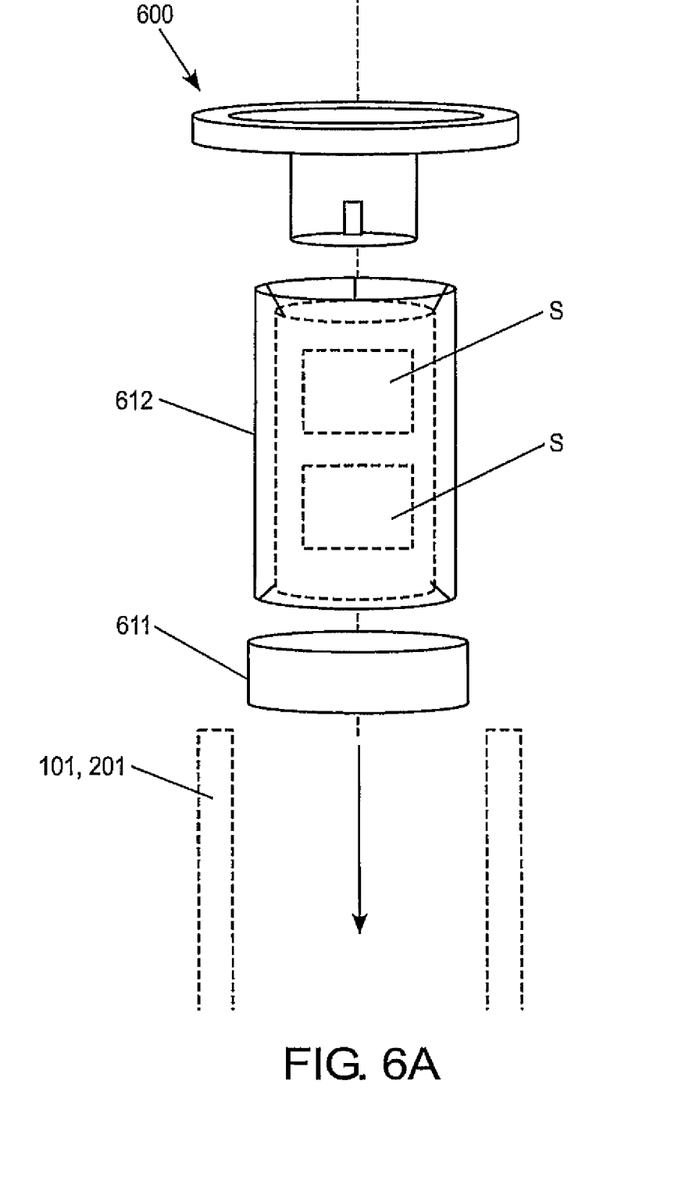
FIG. 6A is an exploded view of an exemplary sensor bay assembly and FIG. 6B is a schematic illustration of an exemplary sensor top cap according to certain aspects of the present invention.

A section such as the top section of the utility pole can house a sensor bay assembly for receiving one or more sensor packages S, as seen in FIG. 6A. A sensor bay 612 fits into the hollow tubular form of a section of the pole (e.g., 101, 201). A bottom cap 611, optionally of a rubbery nature, can mount to the bottom of the bay 612. A top cap 600 can fit over the top of the bay 612 and contact the end face of the pole section 101, 201. The sensor bay 612 is optionally made by pultrusion process in one embodiment. The sensor bay 612 can optionally serve as a harness to carry data between the sensor bay 612 and ground equipment or up to an antenna array for transmission of the sensor signal. This conduit can also serve as a pathway to bring solar power from the top down to the sensor package house within the sensor bay 612, for autonomous operation. The harness can be made of radio frequency transparent materials that can allow signals to be transmitted or received through the wall of the sensor bay 612. The sensor bay assembly can be long enough to extend down the inner periphery of the pole to a location, for example, where the cross members lie in order to minimize distance to the lines if inductive sensing devices or methods are employed.

Figure 6B:
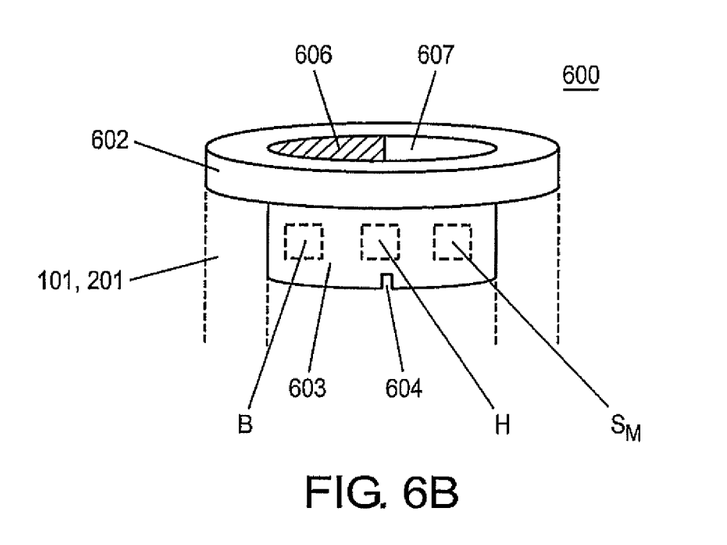

FIG. 6B is a schematic illustration of an exemplary top cap 600 for a top section of a modular utility pole and/or sensor bay assembly. The top cap 600 includes a lower receiving collar 603 to fit snugly into the sensor bay 612 and/or inner periphery of the pole section 101, 201. The upper flange 602 rests on top of the pole, and a receiving groove 604 is adapted to mount the top cap 600 into the sensor bay 612 in a relatively fixed position. A solar panel 606 can be provided in the top of the upper flange 602 along with an optional antenna 607 for wireless communication. The top cap 600 may also include a battery B, communications hardware H, and/or one or more sensor packages, such as power line monitoring sensors Sm.

The hollow tubes comprising the sections of the modular composite utility poles can be made by filament winding. In filament winding, a filament is wetted in polymer or resin prior to winding the wetted filament on a mandrel (typically with a fully automated, continuous process) before curing. Filament winding provides advantages in being able to make the desired tapered geometries that are structurally optimized, with high quality of the finished goods, full automation, and cost effectiveness. The fiber can comprise any suitable fiber such as continuous E-glass roving, E-CR glass roving, or other similar fiber product. The polymer or resin can comprise, for example, a polyester resin, a vinyl-ester, a polyester and vinyl ester blend, or an epoxy. The resin may include pigment and UV blocking additive throughout the structure, so that no secondary coating is required. The finished sections should have little or no volatile organic compound content.

The full or partial wall thickness of one or both ends of the tapered hollow tube can machined at a predetermined position on the section, optionally after being built up to an increased wall thickness as schematically illustrated in FIG. 1. Furthermore, the one or more apertures for securing the joint can be created at a predetermined position. At least one of these operations are preferably accomplished via computer controlled machining. As a result, the corresponding features are precisely located. This ensures that each example of a particular section has the same dimensions, so that the sections can be readily interchanged in the field.

Figure 7:
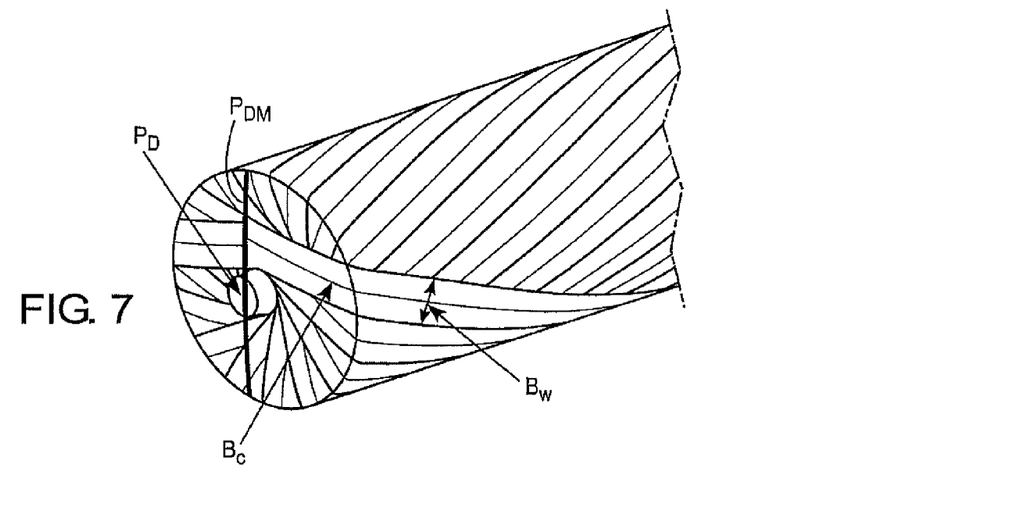
FIG. 7 is an illustration of the end of a mandrel wrapped with a resin impregnated fiber in an axial pattern according to conventional technology.

Winding axial reinforcing typically requires that the resin impregnated fiber be wrapped around the end of a mandrel as shown in FIG. 7, or that the fibers be captured with tooling pins in process of turning around at the end of the part, also known as pin winding. The wind angle is determined by the following formula:

wind angle=arc sin (pole diameter (PD)+band width (Bw)/part diameter (Ppm)

However, both of these methods result in scrap or offal material that must be removed and discarded in a wet uncured state before further curing and processing of the pole section. This process requires time and handling of wet resin impregnated fiber material.

Figure 8:
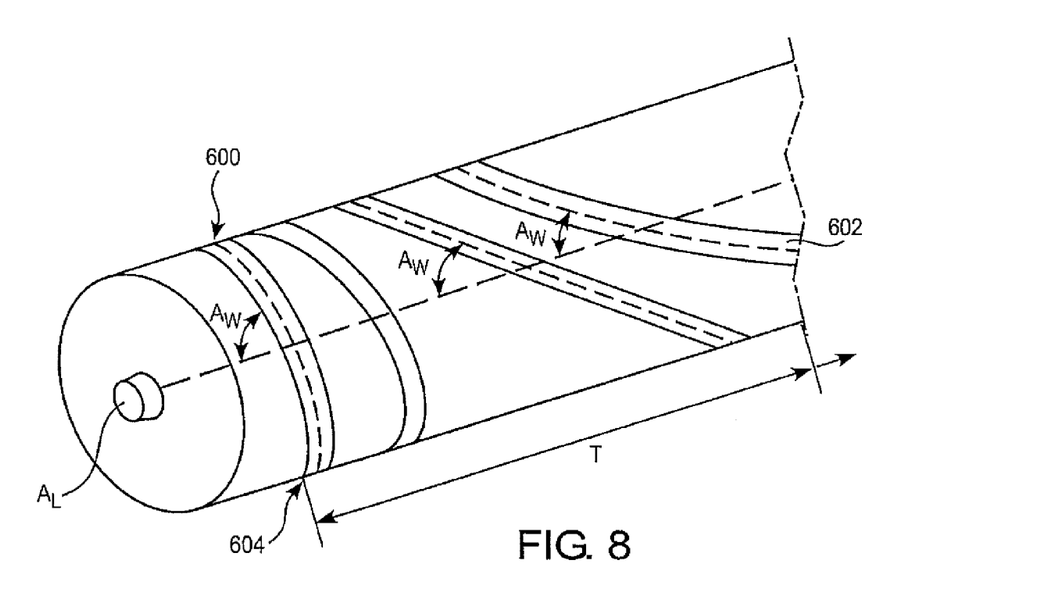
FIG. 8 is an illustration of the end of a mandrel wrapped with a resin impregnated fiber in a variable wind pattern according to the present invention.

Provided is a variable wind pattern that is nonlinear and allows the wind pattern to start in a hoop wrap 600 ($A_w$=85° to 90°) and transition into a substantially axial pattern 602 as shown in FIG. 8. The variable wind pattern approach allows for greater bearing strength within the joint region of the modular pole section without giving up axial stiffness or strength in the main body of the pole section. In conventional filament wound tubular structure, this change in angle may be detrimental to overall structural performance locally, since the wind angle determines performance and the angle will vary along the length of the part. However, unlike conventional tubular pole structures, according to the present invention the variable wind angle enhances the joint performance and adds greater hoop/bearing strength locally in the joint region, whereby it will simultaneously lower the local axial stiffness. The net effect of this change is that the joint performance improves. Meanwhile, outside the joint region and within the transition zone (T) ($A_w$=40° to 65°), within about 24 inches of an end of the part 604, the wind angle approaches a high axial fiber alignment 602 ($A_w$=5° to 25°) from conventional wind pattern that is needed to give the main pole section the bending stiffness and strength required. The additional benefits of this approach are that it will speed up wind time, reduce operator contact with resin impregnated fiber in uncured state, and enable program transitions more rapidly from other ply angles to axial wind angle patterns.

A modular composite utility pole as described can provide numerous advantages. It can seamlessly replace existing utility poles while being easier to install and repair than conventional poles. It is environmentally friendly (it provides a long service life and does not require harvesting from forests) and is recyclable. It resists environmental damage, including corrosion, climate changes, acid rain, insects, animals, and rot. it is structurally robust and energy absorbent. It is lightweight for ease of installation. It is non-conductive.

All numbers expressing quantities of ingredients, constituents, reaction conditions, and so forth used in the specification are to be understood as being modified in all instances by the term "about." Notwithstanding that the numerical ranges and parameters set forth, the broad scope of the subject matter presented herein are approximations, the numerical values set forth are indicated as precisely as possible. Any numerical value, however, may inherently contain certain errors resulting, for example, from their respective measurement techniques, as evidenced by standard deviations associated therewith.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed in accordance with 35 U.S.C. §112, 116 unless the term "means" is expressly used in association therewith.

I claim:

1. A section of a modular composite pole, comprising:
a tapered hollow tube comprising an outer periphery, a first end, and a second end, wherein the first end has a larger diameter than the second end; and
an inner periphery sized so as to define a gap between said inner periphery and an outer periphery of an adjacent section received therein;
and
a built-up ledge around and extending beyond the outer periphery of the tapered hollow tube;
wherein a clearance joint is formed upon assembly with the adjacent section, the clearance joint defined in that it maintains the gap between the inner periphery and the outer periphery and does not rely upon friction between the inner periphery of the section and the outer periphery of the adjacent section.

2. The section of claim 1, the tapered hollow tube further comprising a plurality of plies having one or more filaments wound at an angle relative to a longitudinal axis of the tapered hollow tube.

3. The section of claim 2, wherein said plies comprising plies wound at an angle of about 85 to about 90 degrees, plies wound at an angle of about 40 to about 65 degrees, and plies wound at an angle of about 5 to about 25 degrees, wherein the angles are measured relative to said longitudinal axis.

4. The section of claim 3, wherein the plies are wound, starting at a first end and ending toward a second end, at an angle of about 85 degrees to about 90 degrees in a region corresponding to the area of the clearance joint between pole sections, the plies are wound at an angle of about 65 degrees to about 40 degrees at a transition zone, and the plies are wound at an angle which varies from about 40 degrees to about 25 degrees or about 40 degrees to about 5 degrees until reaching the second end of the pole or pole section.

5. The section of claim 1, wherein the section comprises one or more of:
(a) the tapered hollow tube comprises a wall having a thickness of about 0.2 to about 0.8 inches;
(b) the tapered hollow tube has a length of about 72 to about 224 inches; or
(c) the tapered hollow tube tapers at an angle of about 0.2 to about 0.8 degrees per side.

6. The section of claim 1, wherein said tapered hollow tube comprises glass fiber filament and a polyester resin blend.

7. The section of claim 1, wherein each section includes at least one aperture proximate to an end, the aperture being adapted to align with a corresponding aperture in the at least one adjoining section and to receive a fastener passing through the clearance joint.

8. A modular composite pole, comprising:
a plurality of sections, each section comprising a tapered hollow tube comprising an outer periphery, an inner periphery, a first end, and a second end, wherein the first end has a larger diameter than the second end,
wherein each section is adapted to join at least one adjoining section at a clearance joint, the clearance joint comprising:
the inner periphery of the first end of an upper section overlapping with the outer periphery of the second end of a lower section, the lower section further comprising a ledge proximate to the second end of the lower section, the ledge extending beyond the outer periphery of the tapered hollow tube, wherein the clearance joint defined in that it maintains a gap between the inner periphery and the outer periphery and does not rely upon friction between the inner periphery of the upper section and the outer periphery of the lower section.

9. The modular pole of claim 8, comprising a top section comprising a sensor bay assembly.

10. The modular pole of claim 9, wherein said sensor bay comprises a tubular insert and a top cap comprising, a top flange.

11. The modular pole of claim 9, wherein said sensor bay assembly contains one or more sensor or communications packages.

12. The modular pole of claim 8, comprising a top section comprising a built-up area on said tapered hollow tube adapted for the attachment of heavy equipment.

13. The modular pole of claim 12, the tapered hollow tube further comprising a plurality of plies having one or more filaments wound at an angle relative to a longitudinal axis of the tapered hollow tube, wherein said built-up area adapted for the attachment of heavy equipment comprises plies adapted to increase torsional stiffness and wound at about 40 to about 65 degrees and plies adapted to increase bending stiffness and wound at about 5 to about 25 degrees, wherein the degrees are measured relative to said longitudinal axis.

14. The modular pole of claim 8, comprising a common impact point, wherein the pole sections and clearance joints are configured such that, when the pole is buried in the ground, a first clearance joint between a bottom buried section and the next section adjoining the bottom section is positioned outside the common impact point.

15. The modular pole of claim 8, wherein said pole comprises three or more sections.

16. The modular pole of claim 8, wherein the gap measures about 0.020 to about 0.060 inches.

17. The modular pole of claim 8, the tapered hollow tube further comprising a plurality of plies having one or more filaments wound at an angle relative to a longitudinal axis of the tapered hollow tube, wherein said angle of the plies is about 80 to about 90 degrees relative to said longitudinal axis.

18. The modular pole of claim 8, the tapered hollow tube further comprising a plurality of plies having one or more filaments wound at an angle relative to a longitudinal axis of the tapered hollow tube, wherein said tapered hollow tube comprises plies wound at an angle of about 85 to about 90 degrees, plies wound at an angle of about 40 to about 65 degrees, and plies wound at an angle of about 5 to about 25 degrees, wherein the angles are measured relative to said longitudinal axis.

19. The modular pole of claim 18, wherein the plies are wound at an angle of about 85 degrees to about 90 degrees in the region corresponding to the area of the clearance joint between pole sections, the plies are wound at an angle of about 65 degrees to about 40 degrees at a transition zone, and the plies are wound at an angle which varies from about 40 degrees to about 25 degrees or about 40 degrees to about 5 degrees until reaching the opposite end of the pole or pole section.

20. The modular pole of claim 8, wherein:
(a) each tapered hollow tube comprises a wall having a thickness of about 0.2 to about 0.8 inches;
(b) each tapered hollow tube has a length of about 72 to about 224 inches;
and/or
(c) each tapered hollow tube tapers at an angle of about 0.2 to about 0.8 degrees per side.

21. The modular pole of claim 8, wherein each section includes at least one aperture proximate to an end, the aperture being adapted to align with a corresponding aperture in the at least one adjoining section and to receive a fastener passing through the clearance joint.

* * * * *